Nov. 8, 1938.     L. GORLENKO     2,136,130
VEHICLE BODY
Filed Jan. 28, 1938     3 Sheets-Sheet 1
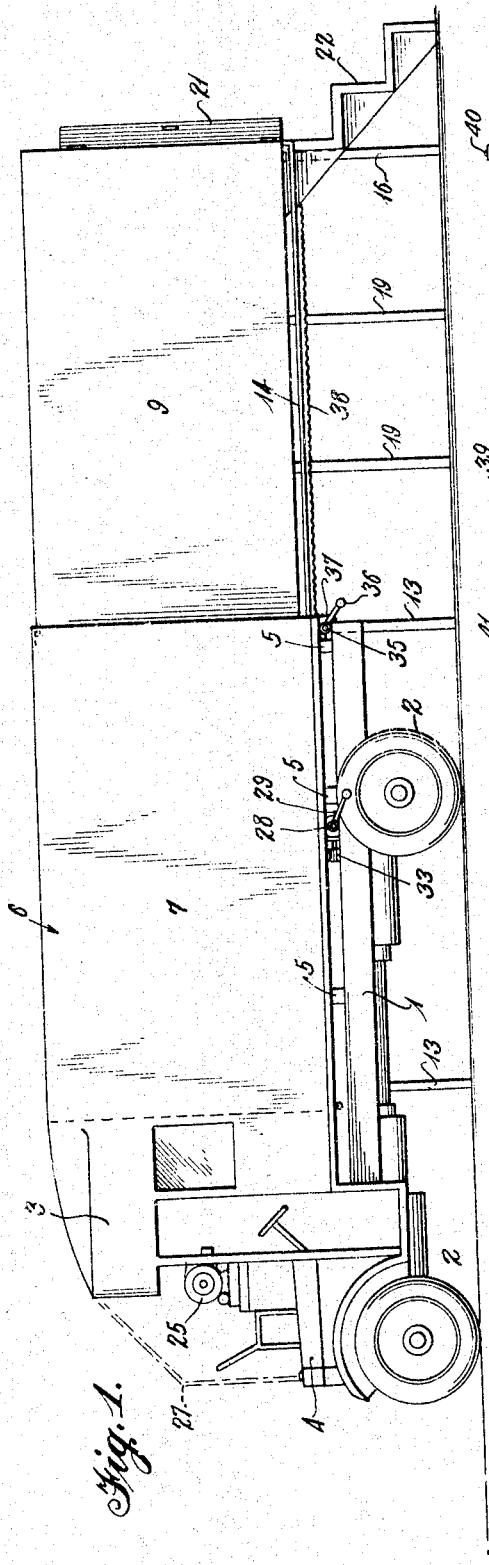
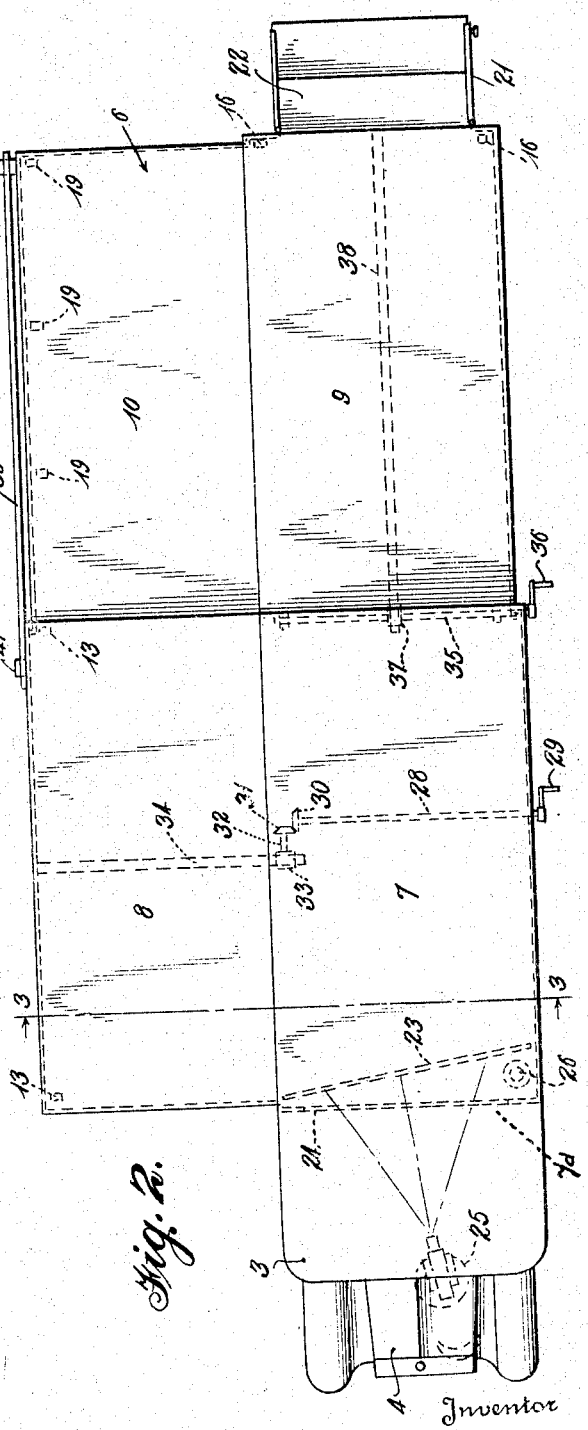
Inventor
*Louis Gorlenko*
By *Stevens & Davis*
Attorneys Nov. 8, 1938.  L. GORLENKO  2,136,130
VEHICLE BODY
Filed Jan. 28, 1938  3 Sheets-Sheet 2

Inventor
Louis Gorlenko
By Stevens and Davis
Attorneys

Nov. 8, 1938.  L. GORLENKO  2,136,130
VEHICLE BODY
Filed Jan. 28, 1938  3 Sheets-Sheet 3

Inventor
Louis Gorlenko
By Stevens & Davis
Attorneys

Patented Nov. 8, 1938

2,136,130

UNITED STATES PATENT OFFICE 2,136,130

VEHICLE BODY

Louis Gorlenko, Arlington, Va.

Application January 28, 1938, Serial No. 187,539

5 Claims. (Cl. 20—2)

This invention relates to vehicles of the van type and more particularly to vehicles comprising a wheeled chassis adapted to be transported from place to place, either under its own power or as a trailer, and an enclosed housing structure mounted on the chassis which is capable of being expanded when the vehicle has reached its destination to permit the exhibition of moving pictures, stereopticon slides and the like before small audiences.

An important object of my invention is to provide a vehicle of the above character in which the housing is composed of a number of telescopically arranged sections capable of being slid longitudinally and laterally of the chassis so as to increase the length and breadth of the housing. In its preferred form, the invention contemplates the provision of means by which the housing sections may be readily slid into and out of their expanded positions.

The invention has as a further object to provide a vehicle of the above character in which the seats provided for the accommodation of the audience are attached to the floors of the several housing sections and are so constructed and arranged as to be folded against the floors and concealed between the overlying floors of the telescoped sections when the housing is fully collapsed and prepared for moving to a new locality.

Another object of my invention is to provide a vehicle of the above character in which the clearance between the sliding sections of the housing are effectively sealed against the elements and the infiltration of light so as to provide a weather-tight completely darkened enclosure suitable for the projection of pictures upon a screen and to facilitate heating the enclosure when outside temperature conditions make this necessary.

Still another object of the invention is to provide a vehicle of the above character including a projection curtain or screen and so constructed and arranged that the projection machine may be positioned either in front of or to the rear of the screen.

Other objects and advantages will be apparent from the following detailed description of a preferred embodiment of the invention, reference being had to the annexed drawings, in which:

Figure 1 is a view in side elevation of a van having a housing composed of a number of telescopic sections, the housing being shown in expanded position and serving to provide a darkened enclosure for the exhibition of moving pictures;

Figure 2 is a plan view of the van of Fig. 1;

Figure 3:
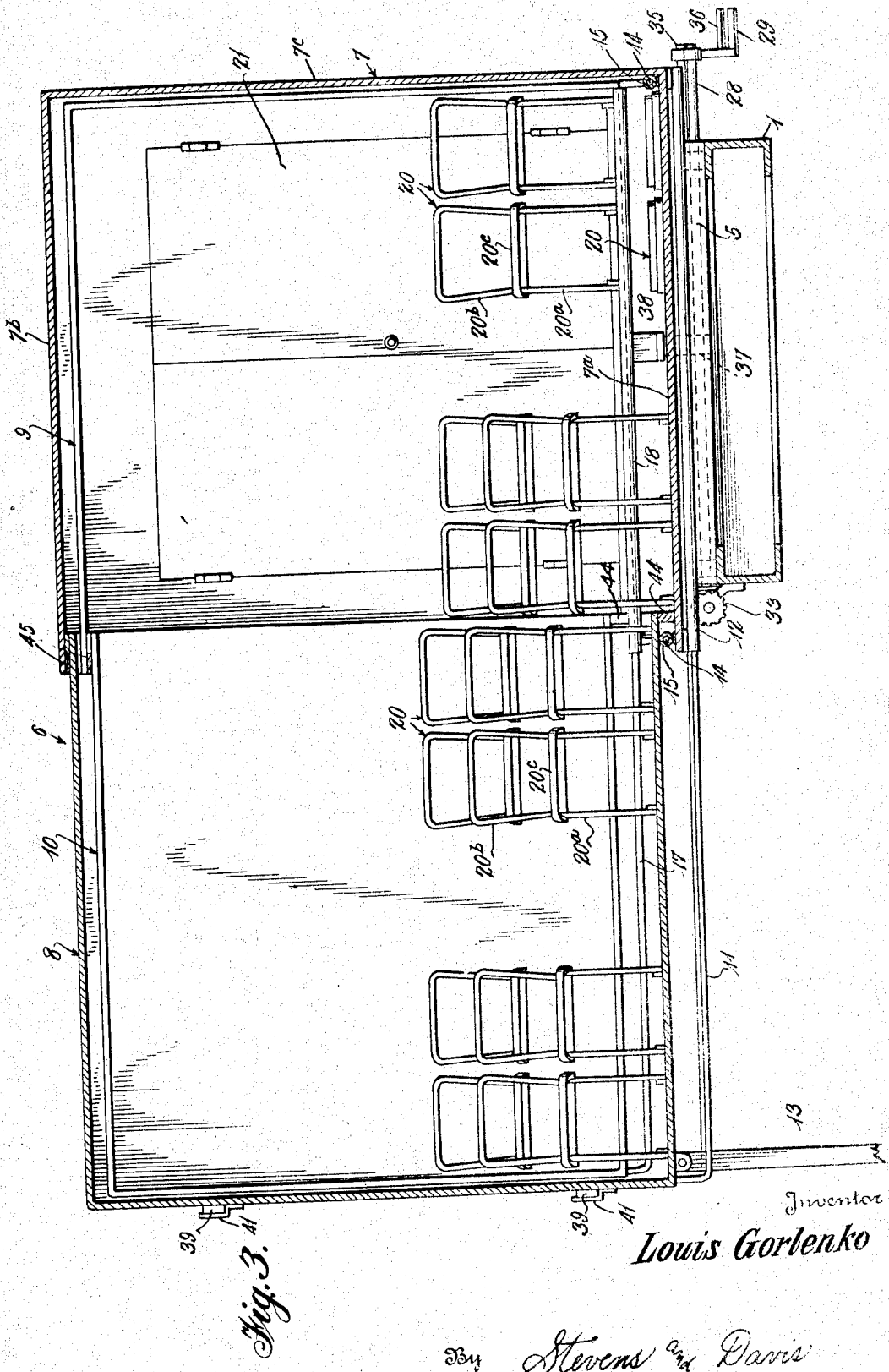
Figure 3 is a transverse cross-section of the van on the line 3—3 of Fig. 2.

Referring to the drawings, in Figs. 1 and 2 is illustrated a van the housing of which is expansible to provide a darkened enclosure for the exhibition of talking motion pictures. One purpose for which the van may be used is as a small portable theatre capable of being moved about among localities having large foreign-born populations for the presentation of talking pictures in the native languages of the people composing such populations.

Another purpose for the van may be to permit giving still or moving picture exhibitions especially suited to the entertainment and education of young school children. Also such a van might be employed by commercial organizations for advertising their goods and services through the medium of moving pictures, and especially those organizations whose goods or services offer their principal sales appeal to special classes of persons to be found in different communities.

The van comprises a chassis 1 mounted upon wheels 2 and having a cab 3 adjacent its forward end for sheltering the operator of the vehicle. A hood 4 at the front of the chassis encloses the engine which furnishes the motive power for the vehicle.

Figure 4:
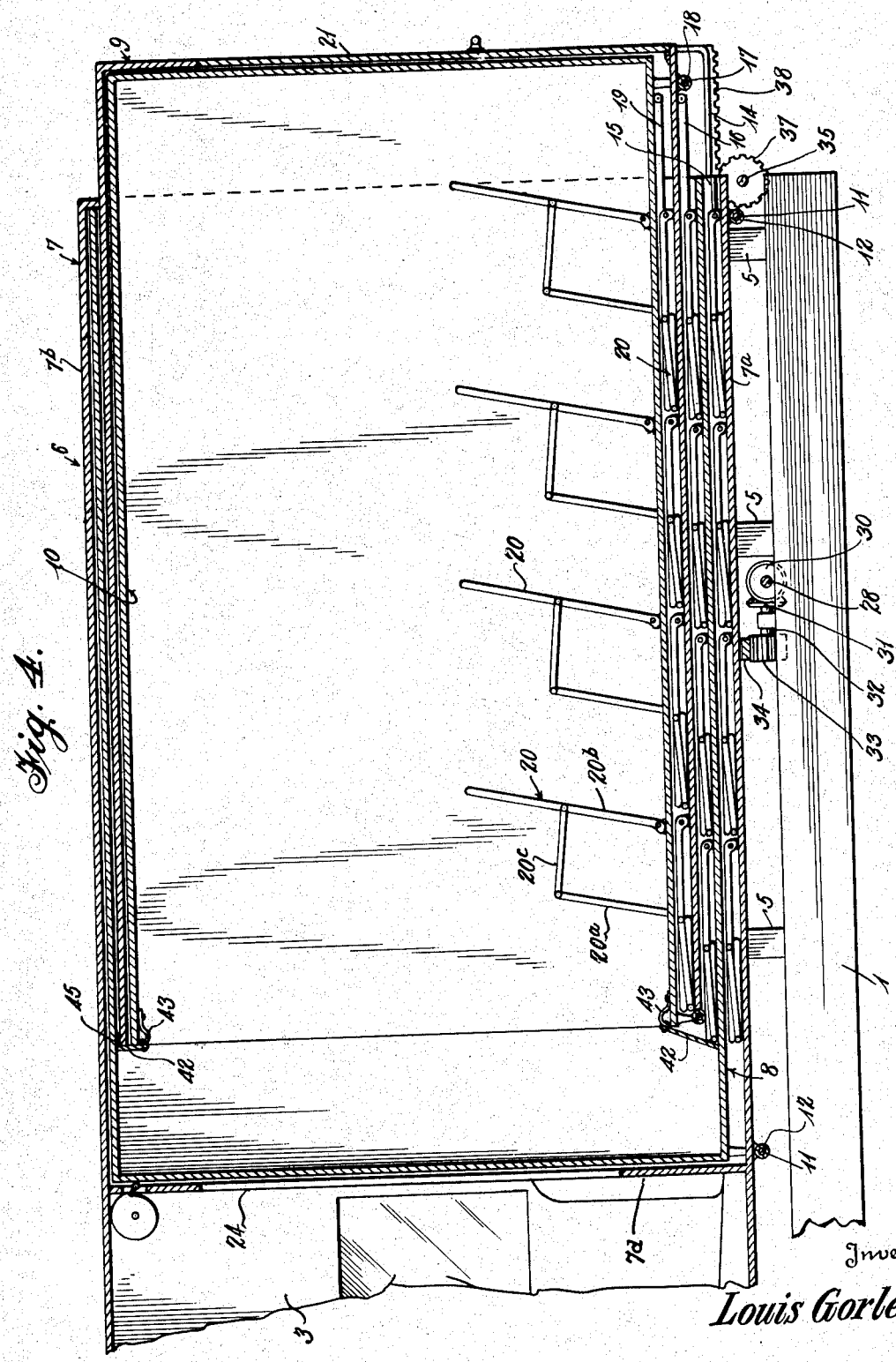
Figure 4 is a longitudinal cross-section of the van showing the position of the parts in partially collapsed position.

Supported upon ties 5 extending across the chassis is a collapsible housing 6. This housing, which is adapted to be collapsed in the manner indicated in the cross-sectional view of Fig. 4, is composed of four telescopic sections 7, 8, 9 and 10, each constituting a quarter corner portion of the housing when the latter is fully expanded. Section 7 comprises a floor or bottom 7a, a top 7b, a side wall 7c and an end wall 7d, the latter being located towards the front of the van immediately behind the cab 3. This section 7 is stationarily supported upon the cross ties and since it provides the section into which the remainder of the sections telescope it necessarily is of somewhat greater height than those sections.

The section 8 likewise comprises a bottom, top, side wall and end wall and is adapted to nest snugly within the stationary section 7 when collapsed but is capable of being slid laterally of the chassis to the position indicated in Fig. 2. Fastened to the underside of the floor of section 8 and extending in the direction of sliding movement of the section is a pair of runners 11 adapted to telescope within a pair of sleeves 12 secured to the bottom of stationary section 7, the arrangement being such that the runners support the load of section 8 and guide it in its sliding movement. Struts 13 hinged to the bottom of this section at its outer end are adapted to be dropped to upright position when the section is fully expanded for the purpose of supporting the extended side of the housing.

Section 9, similarly composed of a bottom, top, side wall and end wall, is arranged to nest within section 8 when the housing is collapsed, as indicated in Fig. 4, but is capable of being slid endwise of the chassis into the position shown in Fig. 2. A pair of runners 14, corresponding to the runners 12 of section 8, are connected to the bottom of section 9 and extend in the direction of sliding movement of the section. The runners 14 telescope within sleeves 15 secured to the bottom of stationary section 7 to support the section and guide it in its sliding movement. Struts 16 hinged to the bottom of section 9 may be swung to vertical position, in a manner corresponding to the struts 13, to support the longitudinally extended end of the housing.

Carried within and adapted to be slid laterally outwardly from section 9 is section 10 comprising a bottom, top, side wall and end wall. Section 10 is adapted to be moved lengthwise of the chassis as a unit with section 9 and subsequently slid outwardly to constitute a rear section of the expanded housing complemental to section 9. A pair of runners 17, fastened to the lower side of section 10 and disposed in the direction of sliding movement of the section, telescopes within a companion pair of sleeves 18 secured to the bottom of section 9, as indicated in Fig. 4. Hinged struts 19 upon the bottom of section 10 may be lowered to afford support for this section when fully expanded.

The top, side walls and end walls of the various sections are arranged in comparatively snug sliding engagement with their companion sections, and felt packing strips, as indicated at 45 in Fig. 3 and Fig. 4, are provided to seal the necessarily slight amount of clearance between the sections. The floors of the sections however are supported by their runners in spaced relation as shown in these figures to provide small compartments between the floors when the housing is collapsed. Arranged in rows facing toward the forward end of the vehicle are chairs 20 each comprising a front frame 20a, a back frame 20b and a seat 20c, all pivotally secured together whereby the chairs may be folded down against the floors of the sections. When the vehicle is traveling from one locality to another with the housing collapsed the chairs are located in out-of-the-way position between the floors of the nested sections.

The end wall of section 9 is provided with a door 21 providing access to the interior of the housing and a pair of steps 22 positioned at the rear end of the vehicle leads from the ground level to the floor level of the housing. An upright projection screen 23 (Fig. 2) is disposed at a slight inclination at the forward end of the housing so as to be clearly visible to the audience occupying the chairs 20 within the housing during moving picture exhibitions. The end wall of section 7 is provided with a window 24 opening from the housing at a location immediately behind the screen into the cab 3 of the vehicle. This window allows pictures to be projected upon the screen from its rear side by means of a projecting machine 25 adapted to be set up upon the hood 4 of the vehicle. An amplifier 26 furnishing the sound accompaniment for the pictures is located in the space behind the screen. Curtains 27 are suitably suspended from the cab to provide a darkened enclosure for the projecting machine operator as well as to shelter the operator and the apparatus from the weather.

As will be apparent from the foregoing description, when the vehicle is moving from one locality to another the housing will be collapsed with the sections occupying their nested positions as indicated in Fig. 4. This figure however shows sections 9 and 10 incompletely nested within section 8, and when fully collapsed the rear end of section 9 will substantially coincide with the rear end of stationary section 7. The space provided by the vehicle will then correspond approximately to the interior of the smallest section 10, which space may be used for the storage of the paraphernalia and apparatus required in connection with the operation of the theatre as well as to provide sleeping quarters for the operator of the vehicle. To facilitate expanding the sections of the housing upon reaching the site selected for a performance there is provided the mechanism indicated schematically in Fig. 2. A shaft 28 mounted upon and extending crosswise of the chassis approximately midway of the stationary housing 7 is provided upon one end with a hand crank 29 and at its other end with a bevel gear 30. This bevel gear engages a companion bevel gear 31 on one end of a stub shaft 32 suitably journaled upon the chassis and extending parallel to and adjacent a side of the chassis. A pinion 33 keyed to the stub shaft engages a rack 34 fixed upon the bottom of section 8. Thus by turning the crank 29 the pinion 33 is rotated to impart movement to the rack to slide the section inwardly or outwardly of the stationary section 7.

Similarly a shaft 35, mounted upon and extending crosswise of the chassis adjacent the end of housing 7, is provided upon one end with a hand crank 36. Midway of its length this shaft has keyed thereon a pinion 37 engaging a rack 38 secured to the bottom of the section 9. Turning the hand crank 36 causes the pinion 37 to be rotated in engagement with the rack 38 to shift section 9 longitudinally of the chassis.

Through the operation of these two hand cranks the housing may be completely expanded. First the crank 36 is operated to slide the section 9 longitudinally of the chassis, this section carrying with it section 10 which is nested therein. Sections 8 and 10 are coupled together by means of a pair of rails 39 extending longitudinally of the vehicle throughout the full length of section 10 and overlying a portion of the section 8. These rails are pivoted at one end to the housing 10, as indicated at 40, and their other ends slide within brackets 41. It will be apparent that after section 9 has been slid rearwardly sections 8 and 10 will be shifted laterally as a unit when the hand crank 29 is operated.

The bottoms, tops, side walls and end walls of the various sections, except for the window 24 in section 7 and the door 21 in section 9, are desirably without openings and the felt packing strips 45 seal the clearances between the companion parts of the housings where they are in sliding engagement. However, when the housing is expanded gaps will occur between certain sections, as for example between the top and bottom of section 8 and the top and bottom of section 9. In order to automatically close these gaps when the sections are moved to their extended positions, there are provided flaps 42 of flexible material, such as a heavy waterproofed fabric, fastened to spring metal arms 43 which snap into position to close the openings as the sections are moved outwardly. Shoulders 44 are also provided in those places where they do not interfere with the sliding movement of the housing sections to close the gaps which would otherwise occur between the sections when expanded. Such shoulders are shown in Fig. 3 located between the spaced apart overlying bottoms of sections 7 and 8 and sections 9 and 10.

The invention may be embodied in other specific forms without departing from the spirit or essential characteristics of the invention, and the present embodiment is therefore to be considered as illustrative and not restrictive, and all changes which come within the meaning and range of equivalency of the claims are therefore intended to be embraced therein.

I claim:

1. A road vehicle adapted to serve as a portable theatre comprising a wheeled chassis and a collapsible housing mounted upon said chassis, said housing including a stationary section and at least three movable sections designed to be telescoped within the stationary section, said sections each having a top, bottom and side wall and together adapted when expanded to form components of a closed housing, and means upon the movable sections slidable within guides upon companion sections for independently supporting said movable sections for movement longitudinally and laterally of said chassis with their bottoms in relative spaced relation.

2. A road vehicle adapted to serve as a portable theatre comprising a wheeled chassis and a collapsible housing mounted upon said chassis, said housing including a stationary section and at least three movable sections designed to be telescoped within the stationary section, said sections each having a top, bottom and side wall and together adapted when expanded to form components of a closed housing, means upon the movable sections slidable within guides upon companion sections for independently supporting said movable sections for movement longitudinally and laterally of said chassis with their bottoms in relative spaced relation to provide compartments therebetween and seats fastened to the sections said seats being so constructed and arranged as to be folded against the bottoms of the sections and to occupy the compartments when the sections are telescoped within each other.

3. A road vehicle adapted to serve as a portable theatre comprising a wheeled chassis and a collapsible housing mounted upon said chassis, said housing including a stationary section and at least three movable housing sections designed to be telescoped within the stationary section, said sections each having a top, bottom and side wall sections each having a top, bottom and side wall and together adapted when expanded to form components of a closed housing, runners upon the movable sections slidable within guides upon companion sections for independently supporting said movable sections for movement longitudinally and laterally of said chassis with their bottoms in relative spaced relation to provide compartments therebetween, seats fastened to the sections said seats being so constructed and arranged as to be folded against the bottoms of the sections and to occupy the compartments when the sections are telescoped within each other and means automatically operable for closing the clearance space between certain of the sections when the sections are expanded.

4. A road vehicle adapted to serve as a portable theatre comprising a wheeled chassis and a collapsible housing mounted upon said chassis, said housing including a stationary section and at least three movable sections designed to be telescoped within the stationary section, said sections each having a top, bottom and side wall and together adapted when expanded to form components of a closed housing, an upright projection screen arranged adjacent the end of one of the sections and a window provided in a wall of said last-mentioned section adjacent and to the rear of the screen through which pictures may be projected upon the screen from exteriorly of the housing.

5. A road vehicle adapted to serve as a portable theatre comprising a wheeled chassis and a collapsible housing mounted upon said chassis, said housing including a stationary section and at least three movable sections designed to be telescoped within the stationary section, said sections each having a top, bottom and side wall and together adapted when expanded to form components of a closed housing, runners upon the movable sections slidable within the guides upon companion sections for independently supporting said movable sections for movement longitudinally and laterally of said chassis with their bottoms in relative spaced relation to provide compartments therebetween, seats fastened to the sections said seats being so constructed and arranged as to be folded against the bottoms of the sections and occupy the compartments when the sections are telescoped within each other, an upright projection screen arranged adjacent the end of one of the sections and a window provided in a wall of said last-mentioned section adjacent and to the rear of the screen through which pictures may be projected upon the screen from exteriorly of the housing.

LOUIS GORLENKO.